3,168,409
PROCESS FOR PREPARING THERMOPLASTIC REGENERATED CELLULOSE
Eric Wellisch, Orange, Conn., assignor to Olin Mathieson Chemical Corporation, New Haven, Conn., a corporation of Virginia
No Drawing. Filed Apr. 20, 1961, Ser. No. 104,224
2 Claims. (Cl. 106—168)

This invention relates to the preparation of a thermoplastic regenerated cellulose which can be pressed into films or extruded into continuous rods.

Traditionally, regenerated cellulose film has been prepared generally in accordance with U.S. 1,548,864 to Brandenberger, wherein aqueous solutions of sodium cellulose xanthate, called viscose, are coagulated and transformed into regenerated cellulose in a series of steps. This entire operation requires the use of special processing and coating equipment. In general, regenerated cellulose prepared in accordance with prior art methods is highly crystalline and devoid of thermoplastic properties, and efforts to press this material into films or extrude it have not been successful.

An object of this invention is to prepare a regenerated cellulose which is thermoplastic. Another object is to prepare a regenerated cellulose which can be pressed into films or extruded into continuous rods. Still another object is to provide a process by which such a thermoplastic regenerated cellulose can be prepared. Other objects will be indicated in the following discussion or will be apparent therefrom.

These objects have been accomplished in accordance with the present invention. It has been found that if cellulose formate esters are rapidly regenerated under certain conditions, a metastable regenerated cellulose is obtained which is thermoplastic. This thermoplastic cellulose exhibits plastic flow at 185–190° C., and it can be pressed into transparent or translucent film, sheets, rods or molded products. A process for accomplishing this novel operation has been established.

The crystalline properties exhibited by regenerated cellulose are largely attributed to the hydrogen bonding between cellulose chains. A thermoplastic cellulose theoretically requires a condition in which a majority of the hydrogen bonds between cellulose chains are eliminated or prevented. One method of eliminating or reducing interchain hydrogen bonding is to interpose small molecules or groups between the cellulose chains. To some extent, this can be accomplished by the formation of cellulose esters. While a certain degree of thermoplasticity is obtained in this way, regeneration of estesr such as the acetate, propionate, butyrate and higher analogues is difficult and slow. On the other hand, cellulose formate esters can be rapidly regenerated, but they are not thermoplastic in view of their high melting points. Efforts to extrude or press cellulose formate esters at elevated temperatures are not successful, since decomposition of such compounds occurs at a temperature below the melting points of the formate esters. Even when plasticizers were present, attempts to extrude solvent-free cellulose formate esters have been impractical.

It has now been found that when cellulose formate esters are rapidly regenerated in the presence of water and certain plasticizers for cellulose, an amorphous regenerated cellulose is obtained which can be pressed, molded or extruded into transparent or translucent products. X-ray diffraction patterns have confirmed the absence of formate groups and of crystallinity in such regenerated cellulose. The resulting material retains its amorphous character while being dried at low to medium temperatures, and can subsequently be shaped or extruded by the application of heat and pressure.

The thermoplasticity and amorphous character of the regenerated cellulose are retained for extended periods of over a year at storage temperatures of 25° C. and lower. Over a period of time at substantially higher temperatures, crystallization of cellulose occurs and the thermoplastic character of the regenerated material is gradually reduced. However, such crystallization is retarded by the presence of the plasticizer, and if the regenerated material is stored at not higher than 25° C., the thermoplastic properties are retained for extended periods. In general, crystallization is promoted by higher temperatures and thus during extrusion or pressing operations the crystallization of the cellulose is fairly rapid.

The preparation of the regenerated cellulose in the amorphous state and its convertibility to a crystalline state on the application of heat and pressure is a novel feature of this invention. After rapid regeneration of the ester, the regenerated material has the characteristics of a thermoplastic; that is, it exhibits plastic flow and can be extruded or pressed under heat and pressure. However, as the cellulose crystallizes during extrusion or pressing operations, the products such as films, fibers or rods do not retain the properties of a true thermoplastic and do not exhibit the original properties of plastic flow at elevated temperatures below the point of decomposition.

The plasticizers which are effective in accordance with this invention are compounds capable of interfering with or substantially preventing the formation of hydrogen bonds between adjacent molecular chains of cellulose. The polyhydric alcohols containing 2 to 6 carbon atoms or mixtures thereof have been found to be especially effective and preferably use is made of dihydric and trihydric alcohols exemplified by ethylene glycol, propylene glycol, glycerine, diethanolamine, triethanolamine, trimethylene glycol, butane diols such as tetramethylene glycol, butane triol, pentane triol, diethylene glycol, dipropylene glycol and triethylene glycol.

Polymeric vinyl esters have also been found to constitute effective plasticizers for the production of amorphous thermoplastic cellulose, preferably being mixed rapidly in the form of aqueous suspensions with the solution of formic acid.

Polyvinyl esters which are suitable are exemplified by the acetate, propionate, butyrate, stearate, laurate and myristate, as polymers, copolymers, or mixtures thereof. The resulting flocculated precipitate contains the polymer and amorphous cellulose in intimate association such that crystallization of the cellulose is effectively retarded.

The plasticizer is effective over a range of proportions extending from about 50 to 150 parts by weight, preferably about 100, per 100 parts by weight of cellulose.

The rapid hydrolysis of the cellulose formate to cellulose requires the presence of an excess of water, preferably at least 5 to 10 moles of water per anhydroglucose unit. The regeneration is advantageously effected at a temperature below 65° C., preferably at a temperature of 20° to 50° C. The formic acid liberated during the regeneration process is subsequently removed by washing and/or evaporation. Evaporation also results in the removal of exces residual water. However, the thermoplastic cellulose product should not be dried below a moisture content of about 7 to 15 parts by weight of water, preferably about 10, per 100 parts by weight of cellulose. The drying is preferably effected at a temperature of 65° C. or lower, and may be accelerated by vacuum drying, the use of substantially higher drying temperatures being undesirable because of the resulting crystillization of cellulose.

Cellulose formate esters are readily prepared in accordance with known procedures, for example by the reaction of formic acid with cellulose in the presence of inorganic acid catalysts such as zinc chloride, hydrochloric acid or sulfuric acid. Generally, it is advisable to use a cellulose formate containing 2 to 3 formate groups per cellulose unit. For illustrative purposes, the following Example 1 indicates a suitable method for the preparation of the starting cellulose formate.

*Example 1*

Shredded wood pulp (cellophane grade) was milled in a ball mill for 5 hours using 2,300 grams of stones for 100 grams of wood pulp. The milled pulp was then soaked in formic acid for 24 hours at room temperature to further increase its accessibility. The excess formic acid was removed by vacuum filtration and this pretreated pulp was then used for esterification.

50 grams of this ball-milled and pre-treated pulp was mixed with 500 grams of anhydrous formic acid and stirred at room temperature for 3 hours and permitted to digest for several hours. A vacuum was then applied and formic acid distilled out at a rate of 1 drop per second while anhydrous formic acid containing 1 percent of dry hydrochloric acid was added at the same rate. During 6 hours of reaction time at 25–28° C. a total of 664 grams of formic acid was removed and 884 grams of formic acid containing 1% hydrochloric acid was added. Stirring and further digestion was continued for several hours longer at room temperature or slightly above. The viscous cellulose formate solution in excess formic acid was then used as a stock solution.

Analysis of a freshly prepared solution indicated that 84% esterification had occurred, or in effect 2.6 of 3.0 hydroxyl groups in the cellulose unit had been esterified. Additional esterification proceeds if the solution is allowed to stand in the cold, and, for example, after a portion of the above stock solution was stored in a refrigerator for six months, nearly 100% esterification was obtained.

X-ray diffraction data on cellulose formate prepared in the above manner revealed that no crystalline diffraction pattern was discernible indicating a completely amorphous character.

The following example illustrates the preferred embodiment of the rapid regeneration of cellulose formate ester in the presence of water and a plasticizer.

*Example 2*

100 grams of 10% cellulose formate solution was transferred to an Osterizer blender and 900 grams of 50% glycerol solution in water was quickly added. The mixture, at about 20° to 25° C., was beaten for 5–8 minutes at room temperature, and regeneration was complete after this blending period. A white flocculent precipitate of regenerated cellulose was obtained, filtered under vacuum, and washed with 200 grams more of the glycerol solution to remove most of the formic acid present. The wet regenerated cellulose was then dried in air or at 65° C. under vacuum to remove excess moisture. A fluffy white soft regenerated material was finally obtained. Best materials for extruding or pressing into films were obtained when the regenerated material was dried for 2 hours at 65° C. under reduced pressure in addition to air drying.

X-ray diffraction patterns showed the amorphous character of regenerated cellulose prepared in this manner. The thermoplastic character of the material prepared in Example 2 was further indicated by a plastic flow obtained on the Fisher-Johns melting point block. No definite melting point of such regenerated cellulose could be established but at 180–200° C. the cellulose became tacky and began to flow when pressure was applied with a spatula. Upon cooling, a transparent film was obtained which could easily be removed from the cover plates.

It was found that regenerated cellulose prepared above could readily be pressed on a hydraulic press. Platen temperatures and pressures were varied, using a press provided with plates 7 square inch in area, to arrive at the optimum pressing conditions, and these were found to lie between 3000 and 5000 lbs./in.$^2$ and from 185° to 217° C.; pressing time was usually about 30 seconds. The regenerated plasticized cellulose could be pressed into strong, transparent, continuous films, which did not adhere to the pressure plates or to aluminum foil when the latter was used.

The conditions of drying of the regenerated cellulose were found to be a critical factor. Best films were obtained from cellulose which had been dried for 2 hours at 65° C. under reduced pressure in addition to air drying. However cellulose which was air dried for periods extending from 4–72 hours at room temperature also yielded excellent films. Cellulose which had undergone prolonged drying at 65° C. or above yielded brittle and discontinuous films, indicating that the amorphous cellulose obtained by rapid regeneration gradually becomes crystalline at elevated temperatures.

Cellulose obtained by rapid regeneration, as above described, was found to be extrudable. The cellulose, initially of low bulk density, was pressed into cylindrical form to facilitate loading into a melt indexer such as described in A.S.T.M. Test Method D1238–57T, published in "ASTM Standards 1958," Part 9, pages 398–402, American Society for Testing Materials (Philadelphia, Pennsylvania). All air dried cellulose and particularly the cellulose dried for a short time (up to four hours) at 65° C. under vacuum could be extruded. Cellulose dried for prolonged periods at 65° C. or above could not be extruded because of recrystallization. A force of approximately 25 to 30 lb. was needed to obtain an extrudate at 185–190° C. The extruded rod was translucent to transparent. Microscopic examination of cross-sections showed crystalline fibers oriented in the direction of flow. Orientation of the extruded rod was confirmed by X-ray diffraction patterns which also showed increased crystallinity due to extrusion.

*Example 3*

100 g. of cellulose formate solution in excess formic acid (containing 10% cellulose formate by weight) was rapidly stirred while 20 g. of an emulsion containing water and 10 g. of a 1:1 mixture of polyvinyl acetate and polyvinyl stearate was added slowly at a temperature of 20° to 25° C. Hydrolysis of the formate ester occurred during addition accompanied by the coagulation of a white viscous precipitate. Upon further stirring, a rubbery solid was obtained. The association polymer of cellulose and polyvinyl acetate-polyvinyl stearate was subsequently washed free of formic acid by water washing. After washing was complete, the regenerated material was dried for 2 hours at 65° C. under reduced pressure, and a rubbery solid was finally obtained.

*Example 4*

100 g. of cellulose formate solution in excess formic acid (containing 10% cellulose formate by weight) was rapidly stirred while 20 g. of an emulsion containing water and 10 g. of polyvinyl acetate was added slowly at a temperature of 20° to 25° C. During the course of the addition, a viscous coagulate was obtained which upon further stirring solidified to a rubbery solid. This material was washed several times with water to remove formic acid. After washing was complete, the regenerated material was dried for 2 hours at 65° C. under reduced pressure, and a rubbery solid was finally obtained.

Examples 3 and 4 are illustrative of procedures wherein cellulose formate esters are rapidly regenerated in the presence of certain polymers to yield a thermoplastic cellulose which can be pressed into films or extruded. It has been found that polymerized vinyl esters associate readily with amorphous regenerated cellulose and retard the crystallization thereof. In the resulting complexes, such polymers act as internal plasticizers. When the formate esters are regenerated by hydrolysis in the presence of the added polymers, the cellulose product is amorphous and displays the desired thermoplasticity. In Example 3 a copolymer of vinyl acetate and vinyl stearate was utilized, while in Example 4 polyvinyl acetate was used as the polymer. In both cases, a thermoplastic cellulose associated with polymer was obtained after regeneration was completed and after free formic acid was removed from the regenerated materials. Similar results were obtained when the regenerated material was freed of formic acid by slow evaporation in air instead of washing with water.

The rubbery solids obtained in Examples 3 and 4 could be easily pressed into translucent to transparent films, using the above-mentioned hydraulic press. Films of best appearance were obtained with the polyvinyl acetate-polyvinyl stearate complex at 115° C. and 7000 lbs. platen force applied for 30 seconds. At 150° C. the film turned opaque and yellowed at 175° C. The film also became opaque under stress, indicating rapid crystallization. The product of Example 4 when pressed into a continuous film was more brittle than film pressed from the product of Example 3, probably because of the softening effect imparted by the stearate portion of the complex. Likewise, these products could be extruded to form translucent to transparent rods and tubes.

The conversion of cellulose to a form in which it exhibits desirable thermoplasticity is thus accomplished readily and in a few steps, in accordance with this invention. The cellulose is treated to produce cellulose formate, and this ester is rapidly regenerated in the presence of water and of a plasticizer, as above described. After washing and suitable drying of the separated product, the amorphous thermoplastic cellulose product may be converted by the application of heat and pressure to the desired film, sheet, molded objects, tube or rod or may be stored for extended periods at temperatures below about 25° C. before such conversion is effected.

The amorphous thermoplastic cellulose of this invention is particularly advantageous in the production of thick sheets or plates ranging from a few hundredths to a few tenths of an inch in thickness. Heretofore, sheets of such thickness could be produced practically only by the lamination of regenerated cellulose film wherein the individual plies were one- or two-thousandths of an inch in thickness.

What is claimed is:

1. A process for preparing thermoplastic regenerated cellulose which displays an amorphous structure under X-ray diffraction and is characterized by deformability under heat and pressure which comprises mixing a cellulose formate ester with water and a plasticizer for cellulose at a temperature of 20° C. to 65° C. to produce a mixture of amorphous regenerated cellulose and formic acid, said water being employed in an amount of at least five moles per anhydroglucose unit in said formate ester, said plasticizer being chosen from the group consisting of a polyhydric alcohol containing 2 to 6 carbon atoms and a polyvinyl ester of acetic acid, propionic acid, butyric acid, stearic acid, lauric acid, and myristic acid, removing the formic acid from said mixture, reducing the moisture content of said amorphous regenerated cellulose at a temperature range of about 25° C. to 65° C. to a value of about 7 to 15 parts of water per 100 parts by weight of said amorphous regenerated cellulose, with said amorphous regenerated cellulose containing plasticizer to the extent of about 50 to 150 parts by weight per 100 parts by weight of regenerated cellulose.

2. The process of claim 1 wherein the plasticizer utilized is glycerine.

References Cited by the Examiner
UNITED STATES PATENTS 2,172,406   9/39   Power et al. _____ 106—189

OTHER REFERENCES

Ott et al.: "High Polymers," volume V (Cellulose), Part II, 1954, page 766.

MORRIS LIEBMAN, *Primary Examiner.*

JOHN H. MACK, ALEXANDER H. BRODMERKEL, *Examiners.*